Patented Apr. 7, 1942

2,278,469

UNITED STATES PATENT OFFICE 2,278,469

FRUITS AND VEGETABLES

Albert Musher, New York, N. Y., assignor, by mesne assignments, to Food Manufacturing Corporation, Chicago, Ill., a corporation of New York No Drawing. Application July 8, 1939,
Serial No. 283,457

10 Claims. (Cl. 99—104)

The present application relates to food products and it particularly relates to fruits and vegetables and especially those fruits and vegetables of a low starch or no starch content, and still more particularly to the preparation of these materials so that they may have more readily cookable or preparable qualities.

This invention is particularly applicable to fruits and vegetables which in their original condition have a high moisture content as for example in excess of 35% to 50%.

In view of the relatively high moisture content of fruits and vegetables they cannot generally be stored over periods of time without the possibility of spoilage due to fermentation, mold growth, or other forms of deterioration, unless they are subjected to various forms of protection as for instance, refrigeration or dehydration.

Refrigeration however is a very expensive procedure and dehydration likewise offers many disadvantages. For instance, dehydrated fruits and vegetables are quite difficult to prepare and cook because of the fact that in the dehydrating procedure as well as in the storage that follows, there is a tendency for these foods to become tough, hard and compacted, and therefore they are quite resistant to the influence of boiling or hot water when they are ready for the cooking procedure, or, in the case of some dry fruits or vegetables, if they are to be eaten, without cooking, they are in a tough or relatively hard inedible condition.

Because of the formation of the hard surfaces on these dehydrated foods, and because of the formation of hardness throughout the dehydrated food, long cooking procedures as well as soaking procedures are necessary in order to place the food in condition for consumption.

This toughness or hardness or resistance against cooking or absorption of water is due, not alone to the natural hardness of the dried fruits and vegetables, or the fibers therein, but in a great many cases this is due also to the resinous, pasty, gummy and similar materials that are present, or which may be developed through oxidation or deterioration upon dehydration, or while these dried food products remain in storage before sale and consumption.

Aside from the inconvenience and difficulty in preparing foods from dehydrated products, there is also frequently lost, because of the long cooking procedures that are necessary, many of their flavors, essences, vitamins and other valuable qualities and characteristics.

It is therefore among the objects of the present invention to provide improved fruit and vegetable materials, and methods and processes for preparing them, so that they may be readily shipped, stored and merchandised with substantially reduced danger of spoilage by having them in a dry form, but also, at the same time to have them in a condition whereby they will have a very materially improved quick-cooking quality or quick-preparing quality not found in the usual dried or dehydrated food material.

The consumer will thereby be enabled to prepare dehydrated fruits and vegetables much more quickly than heretofore possible into various completed food materials as for instance, soups, sauces, gravies, and various fruit and vegetable dishes, etc.

A further object of this invention is to eliminate, and substitute for expensive refrigeration, a method to preserve fruit and vegetable products during transportation, storage, etc.

A still further object of this invention is to produce fruit and vegetable products which have more digestible qualities than these ordinary dehydrated foods in that the food structure and cell structure is not compacted together and thereby is not toughened to the same extent as the ordinary dehydrated food materials.

Still further objects and advantages will appear fom the more detailed description set forth below, it being understood, however, that this more detailed description is given by way of illustration and explanation only, and not by way of limitation, since various changes therein may be made by those skilled in the art without departing from the scope and spirit of the present invention.

It has now been found that the above objects may be accomplished by subjecting the relatively high water fruit or vegetable material to a dehydrating operation so as to reduce the moisture content to the required amount, followed by exploding these materials in order to render them more quickly cookable. The use of this process in conjunction with freezing and/or cooking and/or enzymic action, and/or other operations where required, will produce relatively quicker cookable products.

Examples of various fruit and vegetable materials that may be used in conjunction with this invention are carrots, celery, peppers, mushrooms, peaches, apricots, pineapples, pears, apples, plums, figs, cranberries, blueberries, strawberries, huckleberries, rhubarb, and so forth.

In dehydrating the food materials of this invention, preparatory to the explosion procedure, they are subjected to any of the various drying methods such as to heat or to hot air at such a temperature and for such a length of time so as to reduce their water content from above 35% to 50% and frequently from above 80% or 90%, to below 35%, and preferably below around 15% or 20%.

This drying process should preferably remove the required amount of water content from the food products without substantially causing any change in the wholeness or unity thereof.

The dehydrated material then containing its relatively reduced quantity of moisture, for instance, below 10% to 15%, is then subjected to an expansion or explosion procedure which will soften, or separate, or disrupt the cell structure, or the entire food structure.

According to this procedure the substantially dehydrated food material containing for example, less than 20% or perhaps less than 10% of moisture is then subjected to a treatment at relatively elevated temperatures and pressures. For best results the pressure should usually be above 20 or 25 pounds per square inch and preferably should be above 40 or 50 pounds per square inch and in some cases it may run as high as 300 or 400 pounds, or more per square inch.

Generally the temperature should be above 200° to 250° F, and it may run above 700° to 800° F. The general range is usually around 400° or 500° F.

This explosion treatment is carried on for a time period and at a pressure and temperature depending upon a number of factors as for instance, the moisture present in the food product, the softness of the food product, the degree of expansion desired, the type of equipment used, whether dry heat or steam or superheated steam is used for the expansion chamber, the time, temperature and pressure conditions themselves, and similar other factors.

The required time for exposure may be 18 to 20 minutes or longer, or it may be under ten minutes and even less than several minutes, whereas in many cases it may be under one minute, and often several seconds or 15 to 45 seconds will suffice to complete the treatment and to give the best result.

The amount of moisture withdrawn or removed before expansion or explosion should be such as to give the best results to carry out the expansion process. With a large number of food products it is preferred to reduce the moisture content of the foods from above 40% to 50% or from above 80% or 90% to below 35%, or preferably to between about 4% and 20%.

If the product to be exploded is a little too dry, additional moisture may be added to the product or to the expanding chamber, as for example, in the form of water or other aqueous material, or in the form of steam or preferably superheated steam.

This expansion or explosion treatment in its generally preferred embodiment is carried out in a steam atmosphere and this steam may be developed by various methods as for instance, from the moisture within the food that is being processed, or by the injection into the pressure chamber of steam, etc. This steam may be controlled so as to maintain or change the moisture content of the food being treated so as to obtain the best results. The moisture added may also consist of, or include, fruit, vegetable, meat, or other juices derived by extraction, expression, or cooking.

After this treatment at elevated temperatures and pressures, the fruit or vegetable material, is suddenly and instantaneously released to atmospheric pressure and temperature or to substantially lower pressures and temperatures, as for instance by opening the particular vessel in which these foods have been treated whether such vessel be of the form of an autoclave, a pressure gun, or some other suitable apparatus.

After the fruits or vegetables have been treated in accord with the process described herein, it is found that the texture and structure thereof has been substantially changed so as to be in a substantially more readily cookable condition. Furthermore, by controlling the conditions of temperatures, pressure, time, etc., this quickly cookable condition can be adjusted so as not to produce any substantial decrease or modification in the content of vitamins, flavor, essences, or other food essentials.

The food piece will usually be increased to as much as 4 to 6 times in volume and even more, as compared with the original dehydrated food piece. It is further found that these food materials are now in a condition where their compact fibers have been to a large degree, torn, separated, or softened, and that a large number of passages and pores have been formed, many of which are greater than capillary size, and many of which are of a connecting or communicating nature.

These passages and pores, and the increased water absorbent nature of the product, now permits water to more readily penetrate into the food piece particularly at elevated boiling temperatures. These new porous food materials may now be placed in hot or boiling water, and they will be very much more readily and quickly cooked. When cooked, they will have desirable characteristics of the cooked food, which ordinarily would have required prolonged boiling, or, in the case of dried fruits and vegetables, which would have required long soaking procedures, or even longer boiling operations.

Furthermore, the flavors and essences and aromas of the cooked fruit or vegetable are greatly enhanced. It appears that the water of the boiling medium has the opportunity of entering into the interstices between and into the separated portions and into the pores, openings and cells, and of developing the flavors therein to a much higher degree than would result from prolonged boiling of the original unexpanded product.

With the dehydrated and expanded or exploded food products of the present invention there is a tremendously greater contact between the boiling liquid and the expanded food material. Even with a relatively very short boil which in some cases may be as little as two or three minutes there is much superior contact over a tremendously greater area between the liquid and the food material than heretofore resulted from even prolonged boiling periods of the same material in its original unexpanded and unseparated condition. The increase in surface area of the food, including interior exposed areas, amounts in many cases from 100% to 1000% or more.

The size, porosity and other characteristics of the food materials made under this invention may be controlled by varying such factors as the extent of dehydration, the temperature of the expansion treatment, the time of the explosion treatment and the pressure to which the food pieces are subjected during such explosion treatment.

Also the atmospheric conditions to which the foods are subsequently subjected upon ejection from the pressure chamber or gun will also largely control the porosity and characteristics of the dehydrated and expanded food pieces. It is also possible to control the expansion, porosity, etc., and to develop variations or new characteristics and qualities in the treated foods of this invention by ejecting them from the pressure chamber into atmospheres having higher or lower pressures than atmospheric or into a partial or complete vacuum, and also into various atmospheres which may contain carbon dioxide, nitrogen, or ozone, or even quantities of oil or aqueous vapors.

Although this procedure of explosion, disruption or expansion is carried out in one step, it may be also carried out in a plurality of steps in which case the same, or different temperatures and pressures and time periods may be utilized. For example, the food material may be subjected to 1 or 2 or 3 or more explosion or expansion treatments of the character above described at temperatures and at pressures, and for time periods that are the same, or higher, or lower, than each other.

In many cases, for instance, a multiple expansion procedure at a lower temperature and/or pressure has advantages over a single explosion at a higher temperature and/or pressure, because, in this way the time, temperature, and pressure of multiple explosion processes may be so regulated that each explosion of the multiple process is not sufficient to provide the full cooking quality that is desired, but relatively less intense explosions take place, which, in the aggregate, will result in the cookability required, without the disadvantages of loss of flavor, excessive disruption of structure, etc.

It is desirable at times to place a coating on or within the pieces of food products so as to permit the formation of harder walls and thereby so as to result in a greater or more efficient explosion of the product. Starch, resins, sugars, gums, and similar materials may be used to provide such a coating, as, for instance, by mixing these materials in water or aqueous materials, and then coating the food product, and then allowing to dry thereon.

The food products treated with the explosion procedure of this invention may be ejected from the pressure chamber, if desired, into oil or molten fat, or into molten sugar, or into fatty or other vapors, or into atmospheres of nitrogen, carbon dioxide, or other inert gases, etc. These embodiments may be used to aid in retention of flavors, retarding or elimination of discoloration, oxidation, etc.

Also, where desired, the fruits or vegetables may be cut or pulverized, after this process, and then if desired, they may be dipped into or coated with a plastic or molten fat etc. to retard discoloration, etc.

An important advantage of the present invention resides in the fact that the dehydration followed by the separation and expansion treatment will separate the fibrous or resinous or similar structure of the products so that the digestion qualities of these exploded food materials will be greatly improved. This is particularly important in view of the fact that some foods are of an indigestible quality due to their toughened or resinous nature which will hereby be avoided or lessened to a remarkable degree.

Moreover, the various fruits and vegetables which may be treated by the dehydration and explosion treatment of the present invention and various food compositions made therefrom are most advantageously cooked because of the fact that they do not immediately sink to the bottom of the vessel to the same extent as the untreated foods. Because of their relatively spongy quality, they float to an extent during the cooking operation and do not sink so quickly to the bottom of the pot and thereby they do not burn so readily. Also they will be much more quickly saturated with the boiling or cooking liquid as the case may be during the short boil procedure.

*Example I*

As an example of this invention, raw celery is cut into small pieces. These pieces of celery are then placed in layers upon trays, and these trays are then placed into a dryer and hot air is passed over.

The drying operation is then continued until the moisture content of the celery has been reduced to about 8% or 10%.

These dried celery pieces are then placed into a closed chamber or into a pressure gun. The temperature therein is then elevated to about 450° F. to 500° F., while superheated steam is raised therein to a pressure of about 50 to 60 pounds per square inch.

After this temperature and pressure has been maintained for about 15 or 20 seconds, the cover is released and the pressure and temperature is suddenly decreased to atmospheric temperature and pressure.

As a result, the celery pieces will be ejected from the pressure chamber, and they will then quickly expand and there will result separation and disintegration of the cell and fiber structure therein, with the formation of pores and passages many of which are greater than capillary size.

The exploded celery pieces may then be dropped into boiling water and they will be substantially more quickly cooked. When so cooked they will have all of the desirable flavors and characteristics of long boiled celery.

The sponge-like structure which results under this invention to various food products has an important advantage in that it may be used to absorb various types of flavors or essences such as vegetable or meat extracts or flavoring solutions and then it may be subsequently dehydrated or dried so that the sponge or expanded food piece will contain within itself the flavors or other materials which it may be desired to add to the food.

The fruit or vegetable food pieces which are obtained after explosion, may be coated, impregnated, or otherwise treated to render them less susceptible to oxidation or deterioration, or to enable them to retain therein, moisture, flavor, and softness of the food pieces, and so as to enhance the quality of being more readily cookable to form a final cooked preparation.

For example, the resulting foodstuff, after the procedure above outlined, may be coated with various preservatives, or protectives against deterioration, either dry, or mixed with liquid materials, or they may be coated with fats or oils, at reduced or increased temperatures, or they may be dusted or coated or impregnated with flavoring materials such as sugar, salt, condiments, essential oils, extracts, various types of flavors, etc. either in dry or liquid or dissolved form.

The fruit and vegetable materials treated in accord with this invention, may be divided into two classes, namely, relatively high sugar-containing materials and relatively low sugar-containing materials. Fruits generally fall within the classification of high sugar foods as well as do some vegetables.

The process for treating high sugar food materials is generally different from the process that is used for treating low sugar materials. For example, in treating high sugar materials, utmost care should be taken not to caramelize the sugar, because this obviously will produce undesirable flavors, and so forth. With these high sugar materials, even slight scorching or slight burning will produce undesirable qualities.

In these cases therefore, it is usually best to subject these high sugar materials to a milder explosion procedure wherein the temperature, and/or pressure, and/or length of time is lower than is used for the low sugar materials.

Also, particularly in the case of these high sugar materials the multiple expansion process is of considerable advantage. Figs, apricots, and even various types of carrots which contain relatively higher amounts of sugar than many other vegetables, are examples of fruit and vegetable materials that may be treated along the lines of this procedure.

In many cases, it is desirable, in the carrying out of this multiple expansion process, particularly in conjunction with these high sugar materials, to adjust the time, temperature and pressure conditions so that an individual explosion will not produce the quick cookability or tenderness that is desired, but so that the aggregate of several explosions will produce the desired qualities in these consecutive expansion steps.

Furthermore, high sugar materials such as dried fruits containing relatively large amounts of sugar, are not normally dried to the low moisture content of low sugar containing materials. Therefore, in these cases, a further process is necessary in the handling of these high sugar materials, in that it is generally desirable to reduce this additional moisture remaining in a normal commercially dried product from about 18% or 20%, for instance, to about 10% or 12%, or even a lower, where it is desired to get the specific type of cell disruption that is required. However, in reducing this moisture content, care should be taken to reduce it at very low temperatures, and preferably under vacuum, so as not to caramelize the sugar. However, of course, in many cases, the high sugar dried fruits or vegetables may be exploded in their normally commercial dried condition so as to produce additional tenderness, and so forth, even if the dryness is not sufficient to produce the required cell and structure disruption.

Also, of course, in the case of many fruits or high sugar materials, where they have been standing for considerable time, and where the sugar has hardened or crystallized, the explosion process of this invention is of advantage in order to loosen the structure thereof.

In the treatment of many high sugar fruits and vegetables, where care is to be taken so as not to produce too high temperatures in reducing the moisture content, a procedure may be followed whereby the high sugar food piece is first given one or several mild explosion treatments, so as to loosen or open the structure thereof, and then, the product may be dried in a hot air current for instance at a relatively low temperature, for the required period of time. Following this, the explosion or series of explosions that are necessary to produce the desired results, may be effected. The advantage of this procedure is that the one or more explosions to loosen or open the structure permits the current of hot air to more rapidly and more uniformly dry the interior and exterior portions of the food piece, and thereby there is less likelihood for caramelization and other deteriorative effects to take place.

Although it is not desired to include rice, wheat, or other high starch containing foods and cereals within the scope of this invention, because they present an entirely different problem and a different result, it is possible to include relatively low starch materials containing generally less than 25% of starch, and preferably less than 12% to 14%, or even less than 5% to 6%. In all cases the starch that is present should be of such small amount that there will be substantially no tendency of the starch granules when they explode during the dehydration and expansion procedure to produce a product that is relatively collapsible, or that substantially disintegrates when it comes in contact with water, as is the case with high starch materials, but rather, the tendency should be for the formation of a relatively porous structure, with passages and interstices, many of which are of a connecting nature, and with a quality that will enable the food piece to retain its required unity when it is cooked in water.

Generally, non-leguminous materials may be better used in carrying out this invention because, although leguminous materials may be treated as herein described, particularly with the various accessory treatments noted herein, nevertheless, leguminous materials apparently require higher pressure or temperatures in order to obtain the desired quick cookable results, and, in applying these higher temperatures and pressures, there are in many cases various flavor or other characteristics that may be harmed. These increased pressures and temperatures are needed because of the hard nature that is usually found in various leguminous materials, which hard nature apparently is produced by the protein or starch present. It is this starch or protein that has a tendency to toughen, or harden, or to cake therein.

In the carrying out of this invention, in the event any of the food materials contain more starch than is desired, or if it is desired to remove any of the starch that is present, this may be accomplished by various methods as for instance, washing out the starch in the desired amount with cold or hot water, by the use of enzymes to convert the starch into sugar, and by various other methods.

It is usually desirable to coat, impregnate or otherwise protect the food products of this invention with protective materials and particularly with water repellent materials such as oils and fats, and preferably with fats which are in a plastic or hardened condition at room temperature. However, under various conditions, various other materials or combinations thereof may be used for impregnation, coating, etc., as for instance, sugar, preferably when it is of a quickly dissolvable or quick cockable nature.

In many cases it has been found desirable to make either an oil-in-water emulsion or a water-in-oil emulsion, but preferably a water-in-fat emulsion, to be used as the protective coating for various food pieces, particularly where briquetting is to be one of the results. An example of a water-in-fat emulsion consists of an emulsion or emulsion-like product made of a sugar syrup mixed with a molten hard fat which is then mixed until the hard fat congeals sufficiently to hold the sugar syrup in emulsified form. This material may be used for coating as well as for binding purposes.

Examples of fats or oils that may be used in the various embodiments of this invention are the vegetable stearins such as cocoanut oil stearin, cotton oil stearin, palm kernel stearin, etc., hydrogenated cottonseed oils, animal fats, olive oil, corn oil, peanut oil, sesame oil, lard, oleostearin, or other fats or oils, etc. Mineral waxes, paraffin, etc., may also be used in certain cases for specific admixtures or applications, although in edible products, the use of these materials are desired only in small amounts.

Fats of a hardened or plastic nature, such as those described above, may also be used where required as binding agents, where it is desired to form the food materials of this invention either by themselves or in conjunction with other food materials, into cakes, briquettes, or other food units.

Preferably, however, when the food materials of this invention, either with or without other food materials, are formed into such food units, for the purpose of resulting in a quick cooking food brick it is preferable to use as the binding agent, binders which will not readily cake or harden, but rather binders which will very quickly disintegrate and melt or dissolve etc., so as to provide for quick disintegration of the food bricks or units and thereby so as to promote quick cookability. The preferable binders for this purpose are plastic, or preferably hard fats, and sugars, either alone, or in combination with each other.

Where sugars are used, they should be of a non-crystallizable nature, or when crystallized, they should be in the form of small crystals with passages and pores throughout, so as to enable quick dissolution, or the sugar may be combined with other materials such as glycerine, etc., in order to produce water retaining, or non-crystallizable quality.

For the purpose of briquetting the various food materials of this invention, the various binder materials that are used may be used separately or may be combined in order to produce the best results. For example, an emulsion of the molten hard fat and the sugar syrup may be made where required. Also, if desired, and particularly where hygroscopic materials are present, the molten hard fat may be used as the protective coating for the hygroscopic materials and is congealed thereon, and then the sugar syrup or other sugar materials may be used as the binding agent, so that the aqueous nature of the sugar syrup does not affect the water absorbent qualities of the hygroscopic material. Still further, where desired, the molded food unit which is bound by a sugar syrup, and in which the pieces have been coated with a fat- or wax-like water repellent material, may be placed for 15 minutes to 1 hour, for instance, into a temterature above the melting point, and preferably just above the melting point of the water repellent material so as to form laminations, etc., and thereby so as to form a more durable food unit, when congealed.

The advantage of having food pieces which have pores, or passageways, is that, particularly as far as briquetting is concerned, these pores or passageways act as a good medium for anchoring the binding agent within each piece, and thereby form a much more substantial food brick.

When molten hard fat is used for instance either as a binding agent or as a protective, it is sometimes desirable to add this molten hard fat at higher temperatures as for instance 200° to 220° F., or higher so as to get a more complete fat coverage, and also in some cases it is desirable immediately after adding the molten hard fat to give the product a quick chill so as to congeal the hard fat as quickly as possible and thereby get as thorough a coating as possible of the hard fat upon the surfaces, and within the interstices and pores of the food pieces. Also in some cases it is desirable to keep the food material for a length of time in the molten fat at the higher temperatures.

In some cases also it may be desirable to use fat of various melting points at different stages in the operations of impregnation or briquetting or coating, as for instance a molten hard fat with a melting point of 100° F. may be used for the purpose of impregnating the food pieces and forming them into a briquette and a molten hard fat of a melting point of for example 120° F. may be used to coat the finished briquette. The result of this will be to give more resistance against atmospheric temperatures on the outside of the briquette, but also to result in a quicker disintegration of the food brick when placed into hot water for cooking.

As noted herein, where it is desired to include hygroscopic materials, such as powdered milk, etc., in a food brick, particularly in conjunction with food pieces which are then treated with aqueous binders or materials such as glucose syrup, etc., it is desirable to coat or mix the milk powder or other hygroscopic materials with a molten hard fat, wax, or other similar water repellent material so as to avoid contamination of the hygroscopic materials with the aqueous nature of the binder or other materials that are used.

In the making of food briquettes, it is often desired to enhance the cooking qualities of the food brick by aerating the food by whipping air or inert gases into the fatty material or into the other materials that are used for binding agents, or by otherwise introducing air into the brick.

Also mixtures of dry effervescent materials such as sodium bicarbonate and tartaric acid may be mixed into the food bricks so that when the brick is cooked, the effervescent agents will combine to form a gas which will result in the brick rising to the surface of the water so as to enable quicker and more effective cooking procedure.

Also, the inclusion of effervescent materials within the brick provides for more ready disintegration of the brick upon cooking, in view of the fact that the effervescent materials, upon coming in contact with water, tend to push the various food particles apart so as to permit quick disintegration, and thereby so as to retard the development of lumpiness or caking.

Example II

There are mixed together a combination of the dehydrated and exploded food materials in the following proportions: 20 grams of carrots, 5 grams of bell peppers and 5 grams of celery. These are then mixed together with salt, pepper, paprika, and some dried tomato powder and onion powder.

These ingredients are then mixed in a bowl with 120 grams of 110° F. melting point palm kernel stearin hard fat, which has been melted and heated to a temperature of about 220° F. The dry materials are mixed with this molten hard fat at this temperature.

This mixture is then thoroughly stirred until the fat congeals so as to obtain the proper dispersion of the dry materials in the fat. If desired, before the fat hardens, the mixture may be molded, or it may be compressed with or without pressure, into a brick or unit formation. Also, if desired, it may be allowed to congeal and then it may be cut into pieces or packed or pressed into containers as for instance, glass jars, cans, cartons, and so forth.

It is at times desirable in the carrying out of this invention to use a very minimum amount of fat, as for instance, a lesser amount than above given, and only sufficient to coat the food pieces so as to enable their adhesion. Where a very minimum amount of fat is used, it is generally desirable to compress the materials together and keep them in this compressed form while congealing them, so that the best adhesion may take place. This procedure may be used where it is desired to have a minimum amount of fat present.

Example III

A relatively more quickly cooking soup may be made, as, for example, the following beef broth, by using 170 grams of palm kernel stearin of 115° melting point, 50 grams of salt, 40 grams of onion powder, 60 grams of dehydrated beef extract, 50 grams of exploded carrot pieces, 100 grams of quick cooking oatmeal flakes, 35 grams of a dry powdered effervescent material and 135 grams of glucose of about 40° Baumé.

The onion powder, the dehydrated beef extract, the exploded quick cooking carrots, the quick cooking oatmeal flakes, and the effervescent material are mixed together thoroughly. The palm kernel stearin is then melted to a temperature of 220°, and at this temperature the mixed dry materials are added and mixed therein.

This combination is then congealed at 50° F. until the stearin has congealed quite hard around the food pieces. The material is then crumbled so to break away the food pieces from each other, but so as not to pulverize or powder them.

These pieces are then mixed with the glucose which has previously been thoroughly mixed together with the salt. After this mixture has taken place, it is proportioned into predetermined quantities and compacted into molds.

These food units are then allowed to stand at a temperature of about 65° F. at a reasonably low humidity, with air circulation, for a period ranging from about 4 to 10 hours, or until the bricks are fairly durable, or rather dry. They are then placed in a warm temperature of 130° F. for 45 minutes, after which they are removed and immediately chilled at a temperature of 40° F.

These food units should be molded in predetermined quantities so that each unit may be used with a specified amount of water or other aqueous materials so as to produce a required amount of soup.

Examples of various other soup formulas that may be used in conjunction with the exploded fruit and vegetable materials of this invention are as follows:

|  | Example IV | Example V | Example VI |
|---|---|---|---|
| Vegetable soups: | Parts | Parts | Parts |
| Palm kernel stearin | 90 | 120 | 120 |
| Puffed barley | 60 | 60 | 60 |
| Quick cooking oatmeal | 40 | 40 | 40 |
| Salt | 30 | 20 | 20 |
| Exploded carrots | 35 | 25 | 20 |
| Tomato flakes | 15 | 15 | 15 |
| Onion powder | 15 | 15 | 15 |
| Exploded celery | 15 | 15 | 5 |

|  | Example VII | Example VIII |
|---|---|---|
| Cream of barley soup: | Parts | Parts |
| Palm kernel stearin | 90 | 90 |
| Puffed barley | 110 | 110 |
| Quick cooking oatmeal | 35 | 20 |
| Salt | 20 | 12 |
| Powdered milk | 40 | 35 |
| Exploded celery | 5 | 5 |

It will be noted that these examples are made by using hard fat as the binder rather than by using sugar materials as, for instance, glucose, for the binding material.

In general, although the procedure may be varied as required, one of the preferred methods is to mix all of the dry materials together well, and then to heat the palm kernel stearin so as to melt it, particularly to a higher temperature which may run between 200° F. and 230° F., and then to mix the combined dry materials with the molten palm kernel stearin. Then, the mixed material may be put into molds or otherwise allowed to harden. Units may be formed of predetermined weights, sizes, or shapes.

It is generally preferred to have the fat at the relatively higher temperature in view of the fact that it is better able to seep into the interstices and pores of the exploded material so as thereby to anchor itself more firmly within these pores so as to enable substantially enhanced binding action. Also it is of advantage to have the hard fat at these relatively higher temperatures so as to have it produce some form of sterilization or preservative action by having this hot fat contact various interior portions of the material. In fact, it is in many cases desirable to maintain the molten hard fat at the relatively higher temperature of for instance 200° F. to 230° F. for a required time as, for instance, 5 minutes to 20 or 25 minutes, while keeping the food materials within this hot molten fat. This tends to produce further entrenchment of the fat within the food piece, and particularly, it tends to produce further protective action against mold growth, etc.

If it is desired not to reduce the moisture content very much in these food materials, the fat may be kept within lower ranges of temperatures, whereas, if it is desired to reduce the moisture content or to reduce some of the surface moisture, the temperature of the fat may be raised to a higher temperature as desired during this operation.

When powdered milk is used in the formula it is generally advisable not to treat this powdered milk at too high a temperature in view of the fact that there may be a tendency towards burning of this product. In these cases the powdered milk may be added after the sterilization treatment, and then mixed with the food materials, or, the temperature may be maintained at a sufficiently low temperature so as not to char or burn the powdered milk or other similar material.

Of course, instead of the palm kernel stearin noted herein, various other types of fats or combinations of fats or oils may be used, as, for example, various fats which are of a plastic or hard nature at room temperature. The palm kernel stearin noted in these examples, or the other fat that may be used, may be of a melting point of about 115° F., or it may be of whatever other melting point is desired.

Whereas the examples given produce bricks or units, nevertheless, the palm kernel stearin or the other plastic or hard fat may be eliminated, or substantially reduced, so as to have the product result in a powdered, pulverized, or loose-food-piece soup combination which may be packaged in individual packages and so forth, without being in bound unit form.

Likewise, if desired, various effervescent materials as herein described may be used, in order to enhance quick disintegration and quick cookability.

In the food units described herein various other quick cooking food materials may be used as for instance, exploded meat or fish pieces, or other quick cooking materials which may have been precooked by various methods. All of these materials, however, should generally be adjusted in their quick cooking process so that they will all cook in relatively the same period of time so that some of the food pieces will not be in a relatively hard condition whereas other pieces have become overcooked.

The products treated under this invention should first be sufficiently dehydrated before they are exploded, in order to produce sufficient body and strength so as to withstand the explosion process, without disintegration, and so as to retain substantially their unity in structure.

Furthermore, it is advantageous to cut the fruits or vegetables before dehydrating and explosion, or before explosion, so that their interior portions will be more exposed, and so that these materials will be in relatively smaller pieces. As a result of cutting these materials into smaller portions, the resultant product will have enhanced cookability in view of the fact that there will tend to be formed more widely distributed pores and exploded portions.

Still further, in the explosion of low starch fruit and vegetable materials the resultant pieces are in more or less irregular and uneven shapes, as compared with starchy materials, as for instance, exploded rice. This is due to the fact that the explosion in these low starch materials takes place unevenly and forms uneven pores and passages throughout these pieces.

Also, low starch materials such as low starch fruits and vegetables, are relatively form-sustaining when treated with water, after explosion, as compared with high starch materials which are substantially collapsible when treated with water, after explosion.

The resultant product that is produced as the end product of this invention, may be of various moisture contents, but it usually has been found that it is preferred to have at least 2% to 3% of moisture in the final product or to have above 5% to 8% moisture in the final product so as to enable more ready cookability which is not readily available when the product is entirely dried out. This also has the advantage of enabling the retention of at least some of the water soluble flavors, so as to enhance the flavor element.

In many cases it is desirable to treat the fruit or vegetable pieces, so as not to fully explode them so as to provide for very quick cookability, but rather, the food pieces are first dehydrated and then are exploded relatively lightly, so as to expand, or open up, or separate their structure relatively moderately. This will produce a food piece which has been only moderately treated, but which will have various advantages.

Also, an advantage of the present invention resides in the fact that the dehydration followed by the separation and expansion or explosion treatment will separate the resinous, or toughened, or similar structure of the food material so that it may be eaten without cooking or further treatment. There will be assurance that the digestion qualities are greatly improved even if the expanded materials be eaten without cooking, particularly in view of the known indigestible qualities of various raw vegetables and fruits, etc. due to the their resinous or toughened structure, which now is avoided to a remarkable degree.

Aside from the dehydration and explosion procedures that are used, as disclosed herein, so as to enhance the structure, fiber or cell disruption of the food material, and so as to provide quick cookability, other methods of enhancement may be used in conjunction with this explosion process. For instance, there may be used operations involving soaking or boiling the fruits or vegetables in oil or fat, freezing, cooking, steaming, ageing, or using enzymes, digestives, etc., which processes may be used singly, or in various combinations.

These procedures may be used at various points, as for instance, preliminary to, after, or as an accessory to the explosion operation, so as to further soften the fibers or structure and enhance quick cookability.

As a possible embodiment of this invention, the fruit or vegetable materials may be cooked, or steamed, so as to rupture or soften the body or cell structure of the food material, and then this food material may be dehydrated to a sufficiently low moisture content so as to enable the proper expansion or explosion operation.

It is preferable in carrying out this embodiment of this invention to control this precooking process so as to retain as much as possible of the water soluble flavors and other flavors, essences and qualities of the food products. This is usually done by such methods, as, for instance, cooking or steaming under vacuum, or under pressure, etc., or in the presence of inert gases such as carbon dioxide, nitrogen, etc. Also if desired, the product may be cooked in a high concentration of its own juice, or other aqueous materials may be used instead of water, for this boiling procedure. Also if desired a waterless cooker may be used for this cooking operation.

It is generally desirable however, that at the end of the cooking operation, no free water or at least a very small amount of free water remains, because it is obviously desired that as much of the flavor of the food product as possible be retained or re-absorbed back into the food, rather than have it in the exterior aqueous material. However, if any excess aqueous material remains, it may be dehydrated if desired and the dehydrated material placed along with the food product in order to enhance the food flavor.

This cooking operation may be carried on for such a period of time so as to produce the required softness, and generally it is preferred to continue this cooking or steaming operation to the point that the product is in a relatively soft condition.

Aside from cooking and steaming, or other methods of cooking as, for instance, induction heating, may be used under conditions of various pressures and temperatures, or in conjunction with other cooking or steaming processes.

In the various cooking treatments that are herein described, the water should be present, preferably in sufficient amount so as to be substantially throughout the entire food, and preferably it should be distributed as uniformly as possible so that in the cooking or steaming operation, the entire structure of the food will be affected.

Various repeated cookings may be used to enhance the procedure herein described, or combinations of various cookings, at various temperatures, and under various conditions of vacuum, pressure, etc., in varied sequence, may be used if desired in order to produce the desired amount of softening, or structure or cell disruption.

Following this cooking procedure, the food materials may be dried, preparatory to explosion, or they may be otherwise treated, as required.

Another embodiment of this invention that may be used in order to enhance the quick cookable quality of the vegetables or fruits is to subject these food materials to a freezing operation, and particularly to a slow freezing operation, which will have the effect of rupturing the cells, or softening the fiber and cell structure of the materials.

The fluid that is contained within the cells of the vegetable or fruit, can be frozen so as to produce relatively large ice crystals. These ice crystals are produced not only in the cell itself but also in the space between the cells, and they begin to form, as the temperature is lowered below 32° F. As the temperature is slowly reduced the ice crystals will become larger and will thereby break or rupture the cell and body structure of the food piece. This thereby results in a vegetable or fruit piece, which, particularly when dried, and exploded, will be relatively more water absorbable, and therefore more quickly cookable, or in a more tender condition.

In subjecting these food materials to a freezing operation, the amount of moisture, and the temperatures that are required in order to produce the best results may vary depending upon the degree of softening and rupturing of the cell structure that is required, or upon the nature of the food materials being treated, or upon other conditions. However, it has been found that very good results are obtained usually when the moisture content varies for example, between 30% and 95%, but particularly when the moisture content is over 30% to 40%. Likewise it has been found desirable in many cases, in order to obtain the best results, to permit the freezing to take place slowly at temperatures ranging between 0° F. and 32° F., although in many cases preferred temperatures run down to minus 20° and minus 40° F. and lower. Varying temperatures, further, may be used for varying lengths of time.

In general it should be said that it is desirable to carry out the freezing treatment in such a way that there will not be the formation of small fine ice crystals with the consequent lack of rupture of the cells and structure, but rather that there should be the formation of relatively large ice crystals sufficient to puncture, break, rupture or disrupt the cell structure, or the food structure, substantially throughout the body of the particular material being treated.

The freezing usually takes place at ordinary atmospheric pressure but it may take place under conditions of pressure or vacuum. At times vacuum or pressure is of advantage in that the structure and cell disruption is enhanced by such methods.

The water content in the foods should be present in sufficient amount so that it is carried substantially throughout the food, and preferably, it should be as uniformly distributed as possible, so that when the freezing operation takes place, the entire structure of the food piece will be affected.

It is preferred to have the water present not only in its relatively free form in the food, but also within the cells, or in bound water form. It is in many cases quite preferred in this embodiment of this invention to treat the food materials by cooking, steaming or similar other operations prior to the freezing operation so as to soften, break, or burst all or a good part of the cellular and/or fiber structure of the food pieces. In this manner, as much of the bound water as possible is released, so that the cell walls are broken wherever possible, and also so that additional softening of these fibers can take place previous to the freezing operation.

In connection with the freezing procedures, as well as with the cooking and steaming procedures that are involved, the position of the water in the various foodstuffs is quite important, and as pertains to these various embodiments, this position of the water is utilized to advantage.

The bound water which is contained within the cell structure may be utilized for the purpose of breaking the cell walls so as to soften this structure and so as to facilitate entrance into the cells, of the cooking water, whereas the relatively free water between the cells and fibers may be utilized for the purpose of disrupting and separating the cells and body structure so as to enhance the easy entrance of the cooking water between the fibers, and thereby so as to enhance quick cooking characteristics. This is accomplished in this embodiment by the relatively slow freezing operation or by other operations which result in the formation of large ice crystals within the food so as to rupture the cells and structure of the foodstuff.

As a general rule the temperature may be lowered gradually, slowly, or in steps to temperatures below 32° F. or if desired there may be a relatively faster decrease in temperature say to 20° or 25° F. and then this temperature, after a period, may be decreased further, if desired.

Sudden changes in temperature from higher, to lower, to higher temperatures, etc., with repetition, and with heat, as required, are quite effective as thermal shocks to produce or enhance cell and structure disruption.

In any case however the temperature should be carried out in such a way that the ice crystals will not tend to be of a small, fine crystal formation which will not disrupt the structure of the food.

As one procedure, for example, which may be readily applied to various kinds of fruits and vegetables, the temperature may be suddenly lowered from 32° F. to 25° F. and kept there for a period of say one to two hours. Then the temperature may be gradually lowered to about 15° F. and maintained there for a period of an hour or two hours, or longer if required, and then a further treatment at 0° F., for example may be given, if desired. Following this, the freezing operation will be complete, if the cell structure is sufficiently broken, or longer periods of time may be required at various temperatures.

If desired, depending upon the character and degree of the structure softening or disruption that is required, it is desirable in many cases to let the vegetable or fruit material, during the freezing operation, come back to 32° F. or higher temperatures, so as to melt all or a good part of the ice crystals, and then, to subject the food material again to a freezing procedure. This may be repeated one or more times, as required.

Where there is insufficient water in the cells or fiber structure, or where it is desired to enhance the disruption of the cells or structure, even when the foodstuff contains relatively high percentages of water it is often desirable to force even more water into the cells so as to burst or soften the cells, or so as to enable, during the freezing operation, the formation of ice crystals in the relatively free water that is outside of the cell structure.

This further absorption or enhancement by additional water is accomplished by steaming, cooking, and other similar procedures, under pressure, vacuum, or room temperature, or by various similar methods. Permitting the product to cook or steam in its own juice or in high concentrations of its own juice offers new advantages in flavor and other characteristics.

Various repeated cookings may be used to enhance this procedure, or combinations of various cookings intermingled with various freezings, in varied sequence, if desired, and other combinations may be used in order to produce the desired amount of softening, or fiber or cell disruption.

Following this freezing operation, the food materials are then dried, preparatory to explosion, or are otherwise processed, as required.

In view of the fact that relatively large ice crystals are formed in this freezing embodiment, it is advisable, in thawing these products, to thaw them relatively slowly, and rather completely, before drying them or cooking them, or otherwise processing them. If these frozen food pieces are thawed quickly, there is a tendency for a part of the juice and flavor which they contain to seep out, part of which may be lost, whereas if the thawing is allowed to proceed slowly, a fairly good part of this seepage material is allowed to be reabsorbed by the food pieces.

In carrying out the various embodiments of this invention, it is desirable to cut the food pieces into smaller pieces, and process them in this condition in accord with this invention. Particularly is this desirable where it is desired to have quicker or more complete and more thorough penetration of the cooking, steaming, explosion or other procedures herein described.

For the drying procedure of the various embodiments of this invention, it is desirable to carry out the drying in such a way that the food materials will oxidize as little as possible. For this reason the drying may be carried out, if desired, under vacuum, or in an atmosphere of carbon dioxide or nitrogen, or in other inert atmospheres.

Desirably the drying temperatures may vary for example from 80° F. to 212° F., or more or less, depending upon whether vacuum is used, the degree of dryness that is required or the general characteristics of the food material that is being dried, or depending upon other results or characteristics desired. However, for most purposes the preferred temperatures of dehydration run for example between 120° and 190° F., and the length of time for dehydration necessarily depends upon the amount of dehydration required, the temperature, and other conditions.

Instead of drying the food materials in a dry heat, at the various points throughout the procedures as described herein, these food materials may be placed into a liquid oil or into a molten hard fat and dried to the required moisture content. The molten hard fat in which the food materials are boiled or dried may be allowed to congeal, particularly by quick chilling, so as to immediately harden around the food pieces and thereby so as to act as a water repellent in order to keep as much moisture as possible within the food pieces, and also so as to more fully retain the softness of the structure.

This drying with fats or oils usually takes place at temperatures above the boiling point of the water, and preferably at not too high temperatures, so as to avoid loss of flavor, etc. The molten hard fat can then congeal around the food pieces immediately after the required moisture has been evaporated, and thereby will provide a condition whereby a fat protection will take place immediately after the required amount of moisture has been evaporated, so that there will be relatively little or no oxidation or other deterioration effects taking place from the time the product has been dried until it is protected with the fat.

Although the usually preferred procedure, generally, in the carrying out of various embodiments of this invention, is to first cook or steam if required, and then freeze, if required, and then dehydrate and expand or explode, nevertheless, depending upon the conditions available, the result that it is desired to accomplish, the characteristics of the food, and other considerations, this sequence may be varied from time to time as required. Also various of these operations may be repeated as required in order to enhance this procedure.

For example, also, the food may first be dehydrated and exploded, so as to expand or disrupt the structure, and then it may be re-hydrated, and then cooked or steamed, and frozen, if desired, and then dried again with or without another explosion procedure, as required. Various other sequences may further be utilized.

It is generally found with fruit and vegetable materials that freezing, cooking, steaming, or enzymic action, as described herein, when combined with the explosion process, produce different, and many times, they produce much more acceptable products from the standpoint of quicker cookability than is produced with an explosion process alone.

In fact, in many cases, a considerably less intense explosion may be given to the food pieces, in view of the fact that the structure of the food piece has been to a large degree softened or disrupted by the use of freezing, cooking, or the other procedures. Thereby, the explosion procedure is required primarily for the purpose of expanding or opening up the food pieces, so as to more quickly permit the quick entrance of water into the structure thereof, rather than for the purpose of cell disruption.

Furthermore, in the process of violent explosion, there is not utilized the slow cooking, or slow softening quality such as is produced when freezing or cooking operations are used in conjunction with a less intense explosion or expansion. These slow cooking or pre-softening procedures are quite important with many foods in order to produce properly cooked foods.

In the cooking or freezing procedures, or separately from these procedures, various concentrations of salt and/or sugar, etc., may be used in order to produce various curing effects, for the purposes of preservation, softening, or producing various food characteristics that may be required. Also pickling, or other food procedures may be utilized as required.

With reference to curing operations in conjunction with fruits and vegetables, the explosion procedures herein described are advantageously utilized in that this explosion opens up the structure of the food material and thereby enhances the curing operation by providing quicker and more thorough penetration and curing.

In the embodiments of this invention, the processes that are used should preferably be regulated, where possible, so that the end product, upon being cooked by the consumer in the usual cooking or boiling routine, will retain substantially its unity and will not disintegrate into a mushy or mealy mass.

In view of the fact that fruits and vegetables are generally of a relatively low fibrous nature, care should be taken in the explosion proecdure so as not to give them harsh or violent treatment that will result in a substantial loss of unity in structure. Materials of relatively more fibrous character require different procedures than materials of low fibrous nature, in view of the fact that in the relatively high fibrous content materials, the fibers have a tendency to hold the expanded or exploded material in its unitary form, notwithstanding higher degrees of temperature, pressure, and longer lengths of treatment time.

Materials of a relatively softer or more pulpy nature will therefore require milder treatments with less of the accessory operations such as freezing, steaming, and cooking, as compared with relatively high fibrous materials where it is desired to weaken or soften the high fiber structure.

Although explosion, as described herein, is utilized mainly in conjunction with the vegetable or fruit pieces after the excessive amount of moisture has been reduced from them, and preferably when these food pieces are of a moisture content below 30% to 35%, nevertheless, this explosion may take place while the food retains its full, or a relatively high moisture content. Also, this type of explosion may take place before, after, or in conjunction with the steaming, cooking, freezing or other operations, or this explosion may be given to the food while it is in its raw state prior to any cooking, steaming, or freezing, etc.

The purpose of this type of explosion is different from the explosion procedure mentioned wherein the product is first dehydrated. The procedure heretofore mentioned, which takes place with a product of reduced moisture content, results in an expansion of the product, so as to produce expanded, porous materials. However, the purpose of the present outlined procedure, with the high water content present, is to tear the fibers away from each other, and to loosen the body, and to tenderize the structure of the food piece, rather than to produce an expanded, porous, very quickly water-permeable product.

Of course, the temperature, pressure, length of time, etc., are explosion factors that should be adjusted in this operation so as to aid in providing fod pieces which will not result in a more or less disunified, soupy, or shredded mass but will result in the desired product in which the structure is loosened or weakened.

By the use of this high-water-content explosion process, however, the freezing, cooking or steaming operations which may follow are enhanced, since the weakening of the structure enables better and more complete penetration and action by these other procedures. Following these procedures, the vegetable and fruit food materials should preferably be dehydrated and then exploded in order to produce an expanded quick cookable product.

Because of the structure loosening and weakening that takes place by the use of this explosion process of relatively high water content foods, as, for instance, over 35% or 40%, these high-water exploded foods may be treated, following the explosion, with regular quick-freeze processes so as to produce substantially enhanced quick-frozen products. This explosion procedure in conjunction with these food materials results, for instance, in the enhanced tenderizing of these foods, and so as to further enhance the so-called quick-freeze processes. In the quick-freeze process there is not formed large crystals, but rather, there is formed small minute ice crystals which will not puncture the cell structure.

However, by the use of an explosion procedure with these high water content foods, as herein described, particularly at lower ranges of temperature, pressure, and time limits, there is relatively little, or no disruption of the cell structure when these relatively large amounts of water are present, but there is a separating or loosening of the structure. This operation produces enhanced qualities not only for the tenderizing of the food when it is finally consumed, but also, particularly this process enables a much quicker quick-freeze operation and an improved product, in view of the softening or loosening of the structure of the food material, etc.

The explosion procedure, however, for the general embodiment of this invention, is used primarily in conjunction with fruit and vegetable materials that have first been dehydrated, as described herein, so as to harden their structure and thereby so as to enable the disrupting and opening up of their interior structure and/or cell structure as much as possible, so as to further result in a more water-permeable and water-penetratable product with enhanced quick-cooking characteristics.

Another embodiment of this invention is in conjunction with fruits and vegetables which are to be dried or dehydrated. When these fruits and vegetables have previously been treated in accord with this invention, they are dried substantially quicker, and they receive a substantially more uniform dehydration. This is due to the fact that the structure of the foods has been opened or expanded and therefore air can more thoroughly and more uniformly circulate therein.

Still further, at various points throughout the various procedures, enzymes, ferments, or digestives, as, for instance, enzymes of the nature of diastase, maltase, invertase, etc., may be utilized for the purpose of aiding in softening or preparing the fruit or vegetable piece so as to produce various qualities.

It is generally of advantage to dehydrate and explode or expand the fruit or vegetable before treating it with enzymes or digestives. This treatment with the enzymes may then consist of placing the food into an aqueous medium containing the enzyme. After the expansion process, the digestive medium is better enabled to get within the structure of the food piece and thereby to more readily and more completely affect the food. The enzyme action may be stopped at whatever point is required, as for example, by heat, or other known methods. Also this digestive modification may take place before or after the cooking process, or the freezing process, or at various other points in the procedures of this invention, and the product may then be dehydrated, or further treated, as required.

A still further embodiment of this invention that may be used in conjunction with the explosion procedures herein described, and with or without the accessory operations, as for instance, freezing, cooking, curing, enzymic action, etc., is the use of various rays, such as ultra violet light rays, kindred to X-rays. The use of these rays in conjunction with various food products enables the food to age at warm temperatures, whereby the enzymes may work so as to tenderize it and whereas, at the same time, the use of these ultra violet light rays act to destroy, or keep microorganisms from developing. Following this procedure, the food may be dried and then exploded, as herein described, or the freezing, cooking, or other procedures may take place in conjunction with this ray-ageing treatment.

An alternative procedure that may be used, when it is desired to age the food piece, so as to tenderize it, and at the same time so as not to permit the development of undesirable microorganisms, is to subject the material to a freezing process, which may be either a slow freeze or a quick freeze, and then permit the product to age under these frozen conditions for the desired length of time, in order to age properly and become tenderized as required. After sufficient ageing has taken place, the food piece may be dried and exploded as described herein. The advantage of a procedure of this kind is that, in the ageing process, the body and structure of the food becomes softened. Therefore less violent explosion may be used, even to the extent of not actually disrupting the cell structure to relatively any further extent, but only so as to result in the separation, softening, or loosening of the fleshy structure.

In the combination of food materials in which are included various exploded quickly cookable foods, as for instance, carrots, celery and peppers, it is desirable that these vegetables or foods be treated under this invention so that each of them may thereafter be properly cooked in relatively the same period of time. It is necessary therefore to subject each of these materials separately with the proper and sufficient treatment so as to enable each of them to have relatively the same cooking time.

However, the processing of each of these materials separately may be eliminated, to a very large extent, by the use of the precooking, prefreezing, and similar accessory treatments as noted herein, because, by these accessory treatments the food materials may be softened to relatively the same degree by these accessory treatments, and then they may be dehydrated and expanded or exploded so as to open them up so as to permit the ingress of the cooking water. This procedure therefore permits the explosion of a number of different types of food materials together at the same time without the necessity of processing each of them separately under individual conditions of treatment.

Where it is desired to sterilize, or where it is desired to retard or prevent the growth of mold, etc., the food products of this invention after they have been completed, may be subjected to a sterilization procedure in molten fat whereby they may be retained in the molten fat or in a similar product at a sterilizing temperature for the required period of time. Preferably, this should take place in a closed chamber under pressure so that there will be a minimum amount of moisture lost from the food product, particularly if the finished product contains moisture that it is desired to have the product retain in its finished condition, after sterilization.

Another possible embodiment of the products of this invention is to immerse them into water, or aqueous materials, but particularly into hot or cold brine, as soon as possible after they are dehydrated and exploded, and to freeze them therein. These food materials may then be merchandised as frozen products, and they will retain various advantages accordingly.

A further utilization of this invention is in conjunction with extraction and expression procedures. For example, carrots, or the albedo of citrus peels, or apples may be more readily and more completely expressed or extractions obtained therefrom by the utilization of this invention. If the food material is dehydrated and exploded as herein described, with or without the other processes of freezing, cooking, etc., there is provided a much easier and a more complete extraction of carotene, fruit or vegetable juices, and pectin, for instance.

Of course, where it is desired to obtain the flavors, or other elements from the food piece, there must be added or mixed therewith, a water or oil medium, depending upon the solubility of the elements to be extracted. This medium will re-dissolve these flavors and essences that are contained therein, and there will then be enabled the expression of the elements therefrom in a liquid form.

In carrying out this invention with fruits and vegetables that contain amounts of starch, or protein, or both, and particularly when these materials are present in relatively higher amounts, it is generally desirable to remove these materials or to modify them so that they will not produce a hard or tough structure, or rather, so that the structure of the fruit and vegetable material will be softened, or so that it will be made more digestible.

This procedure of removing or converting the starch or protein material may be carried out in various ways. For instance, cold or warm water may be used to wash out these starch or protein materials by soaking the fruits and vegetables in the water, or by repeated washings, etc. Various other washing materials or solvents, etc., may also be used, as, for instance, salt water, alcohol, acid materials, alkali materials, and so forth, depending upon the nature of the material to be extracted and the end results desired. In the case of many protein materials, for instance, a salt water in a concentration of, for example, 2% to 10%, is a good solvent or extracting solution to use.

Also, in many cases, enzymes are very advantageous in the carrying out of this embodiment. In the case of starch, for instance, diastatic enzymes may be used, and in the case of protein materials, proteolytic enzymes may be used. The enzyme action may be started, and then it may be stopped at the required point by the application of heat or by other means.

The enzymes or other materials may be used to convert the starch material into sugar, for instance, or to convert the protein material into amino acids, and, in this way, these materials may be more readily washed out of the fruit and vegetable, or, if desired, the sugar, for example, may be allowed to remain therein in this modified form, whereby there will not be the usual caking or hardening.

In carrying out this embodiment it is not necessary to convert all of the protein or starch material that is present, but a partial amount of either or both of these materials may be converted, or washed out, or modified, so as to produce the required enhancement of the fruit and vegetable material.

Various other procedures, as, for instance, various hydrolyzing procedures may be used to accomplish these results. For example, the starch may be hydrolyzed by the heating of the sugar-containing material in a solution containing a small amount of acid, or, in many cases, the protein-containing material may be placed into a solution of the proper pH, or which is adjusted within the required ranges of the isoelectric point, and then an electric current may be passed through.

In carrying out the various procedures of this embodiment the washing, soaking, enzymic, electrolytic, or other treatments may take place before or after the explosion procedure. In many cases it will be found that it is desirable to first explode the material so as to open or increase the porosity of its structure and thereby so as to permit the various solutions to more easily enter and produce the conversion, modification, or removal result.

In many cases, however, it will be found that more of the starch or protein material may be removed by utilizing one of the conversion or removal procedures named herein before the product has been subjected to any heat, because of the tendency of heat to produce coagulation or fixing, for instance, of the protein or starch, and thereby make it harder to remove these materials therefrom. However, this is subject to experimentation in individual cases, because, as noted herein, it may be possible to produce the result desired, after heat has taken place, or after the explosion procedure.

In many cases, of course, a washing or removal procedure may take place prior to the application of heat, or prior to the explosion procedure, and then another removal or conversion procedure may take place after the heat or explosion procedure, or various sequences or repeated combinations of these procedures may take place as required.

What I claim is:

1. Structure disrupted, steam exploded, expanded, dehydrated, relatively low starch, relatively high sugar food products selected from the group consisting of fruits and vegetables, said food products retaining substantially their unity, said sugar being in a relatively uncaramelized condition.

2. Structure disrupted, steam exploded, expanded, dehydrated, relatively low starch food products selected from the group consisting of vegetables and fruits, said food products retaining substantially their unity, said structure being in a relatively porous condition, and said pores having impregnated therein a coating material.

3. Structure disrupted, steam exploded, expanded, dehydrated, relatively low starch food products selected from the group consisting of vegetables and fruits, said food products being in a quickly cookable condition.

4. The method of producing relatively low starch food products selected from the group consisting of fruits and vegetables having relatively quicker cookable quality, said method comprising dehydrating the food products so as to provide a firmer structure, and then subjecting them to steam at an elevated pressure and temperature, and then suddenly releasing them to a substantially lower temperature and pressure, said food products having a moisture content in excess of 2%, and said food products retaining substantially their unity, said food products being dehydrated prior to the steam treatment to a moisture content between 2% and 35%.

5. The method of producing relatively high sugar food products selected from the group consisting of fruits and vegetables having relatively quicker cooking quality, but with said sugar in a relatively non-caramelized condition, said method comprising dehydrating the food products so as to provide a firmer structure, and then subjecting them to steam at an elevated pressure and temperature, and then suddenly releasing them to a substantially lower temperature and pressure, said elevated temperature and pressure being sufficiently low so as not to substantially caramelize the sugar present, said food products being dehydrated prior to the steam treatment to a moisture content between 2% and 35%.

6. A structure disrupted, steam exploded, expanded, dehydrated, relatively low starch vegetable having a moisture content in excess of 2%, said vegetable being in a quickly cookable condition.

7. The method of producing a quickly cookable food product selected from the group consisting of low starch fruits and vegetables, said method comprising dehydrating said food product to below 35% moisture so as to provide a firmer structure, then subjecting it to steam at an elevated temperature and pressure, then suddenly releasing to a substantially lower temperature and pressure, and then repeating, at least one more time, the process of subjecting it to steam at an elevated temperature and pressure and suddenly releasing it thereafter to a lower temperature and pressure.

8. The method of producing a quickly cookable food product selected from the group consisting of low starch fruits and vegetables, said method comprising cooking the food product so as to soften it, then dehydrating the said food product to a moisture content below 35%, then subjecting it to steam at an elevated pressure and temperature, and then suddenly releasing it to a substantially lower pressure and temperature.

9. The method of producing a quickly cookable food product selected from the group consisting of low starch fruits and vegetables, said method comprising freezing the food product so as to rupture at least a portion of the cell structure throughout the said food product, then dehydrating the food product to a moisture content below 35%, then subjecting it to steam at an elevated pressure and temperature, and then suddenly releasing it to a substantially lower pressure and temperature.

10. A structure disrupted, steam exploded, expanded, dehydrated, relatively low starch fruit having a moisture content in excess of 2%, said fruit being in a quickly cookable condition.

ALBERT MUSHER.